United States Patent [19]
Lin et al.

[11] Patent Number: 6,059,858
[45] Date of Patent: May 9, 2000

[54] HIGH TEMPERATURE ADSORPTION PROCESS

[75] Inventors: Yue-Sheng Lin, Cincinnati, Ohio; Donald L. MacLean, Clinton; Yongxian Zeng, North Plainfield, both of N.J.

[73] Assignee: The BOC Group, Inc., Murray Hill, N.J.

[21] Appl. No.: 09/175,176

[22] Filed: Oct. 20, 1998

Related U.S. Application Data

[60] Provisional application No. 60/064,371, Oct. 30, 1997.

[51] Int. Cl.⁷ ..................................... B01D 53/04
[52] U.S. Cl. .................. 95/96; 95/104; 95/119; 95/138; 95/139
[58] Field of Search .................. 95/54, 96, 97, 95/104, 138, 117–119; 423/219

[56] References Cited

U.S. PATENT DOCUMENTS

| | | | |
|---|---|---|---|
| 5,160,713 | 11/1992 | Mazanec et al. | 95/54 X |
| 5,240,473 | 8/1993 | Carolan et al. | 95/54 |
| 5,240,480 | 8/1993 | Thorogood et al. | 95/54 X |
| 5,261,932 | 11/1993 | Carolan et al. | 95/54 |
| 5,269,822 | 12/1993 | Carolan et al. | 95/54 |
| 5,702,999 | 12/1997 | Mazanec et al. | 95/54 X |
| 5,712,220 | 1/1998 | Carolan et al. | 95/54 X |
| 5,733,435 | 3/1998 | Prasad et al. | 95/54 X |
| 5,753,007 | 5/1998 | Russek et al. | 95/54 X |
| 5,788,748 | 8/1998 | Mazanec et al. | 95/54 X |
| 5,817,597 | 10/1998 | Carolan et al. | 95/54 X |
| 5,820,655 | 10/1998 | Gottzmann et al. | 95/54 |
| 5,855,648 | 1/1999 | Prasad et al. | 95/54 |
| 5,865,878 | 2/1999 | Drnevich et al. | 95/54 |
| 5,888,272 | 3/1999 | Prasad et al. | 95/54 |
| 5,910,238 | 6/1999 | Cable et al. | 95/54 X |
| 5,935,298 | 8/1999 | Prasad et al. | 95/54 X |
| 5,938,822 | 8/1999 | Chen et al. | 95/54 X |
| 5,944,874 | 8/1999 | Prasad et al. | 95/54 |
| 5,954,859 | 9/1999 | Keskar et al. | 95/54 |
| 5,964,922 | 10/1999 | Keskar et al. | 95/54 X |

FOREIGN PATENT DOCUMENTS

| | | | |
|---|---|---|---|
| 61-247621 | 11/1986 | Japan | 423/219 |
| 4-161219 | 6/1992 | Japan | 423/219 |
| 5-4044 | 1/1993 | Japan . | |
| 2257054 | 1/1993 | United Kingdom | 95/54 |

*Primary Examiner*—Robert H. Spitzer
*Attorney, Agent, or Firm*—Philip H. Von Neida; Salvatore P. Pace

[57] ABSTRACT

Oxygen is removed from gas streams by subjecting the gas stream to a pressure swing adsorption process carried out at temperature in the range of 300 to 1400° C. using as adsorbent a perovskite material having the structural formula $A_{1-x}M_xBO_{3-\delta}$, where A is a rare earth ion, M is Na, Ca, Sr, Ba or mixtures of these, B is Co, Mn, Cr or Fe, x varies from 0.1 to 1 and $\delta$ is the deviation from stoichiometric composition resulting from the substitution of Sr, Ca and Ba for rare earth ions.

25 Claims, No Drawings

HIGH TEMPERATURE ADSORPTION PROCESS

RELATED CASE

This application claims priority based on provisional application Ser. No. 60/064,371, filed Oct. 30, 1997.

FIELD OF THE INVENTION

This invention relates to the adsorption of oxygen from gas streams, and more particularly to the adsorption of oxygen from gas streams at high temperatures using ceramic material-based adsorbents. The invention is especially useful for producing high purity nitrogen or high purity oxygen by the adsorption of oxygen from air using adsorbents having the perovskite structure.

BACKGROUND OF THE INVENTION

Air can be separated into its component parts by several techniques, the most common of which are cryogenic distillation, membrane separation and adsorption.

Recent advances in adsorption technology have made this method of air separation highly suitable for a variety of applications, e.g. portable oxygen or nitrogen generators. The particular adsorbent used in air separation depends, in general, upon the product that is sought. It is usually preferred to use an adsorbent that will adsorb the unwanted components from the gas being separated, so that the desired product can be obtained as the non-adsorbed, high pressure product. Thus, when oxygen is the desired product, nitrogen-selective adsorbents, such as sodium- or lithium-exchanged type X zeolite or calcium-exchanged type A zeolite are used; and when nitrogen is the desired product, it is more efficient to use an oxygen-selective adsorbent.

One of the more preferred oxygen-selective adsorbents is carbon molecular sieve (CMS), since nitrogen of very high purity, e.g. 99% purity, can be produced using this adsorbent. CMS adsorbs both oxygen and nitrogen; however, it adsorbs oxygen at a considerable faster rate than it adsorbs nitrogen. Hence, CMS can be efficiently used for oxygen-nitrogen separations carried out by pressure swing adsorption (PSA) processes having very short cycles. The adsorption is generally carried out at temperatures below 50° C., since best results are obtained at low temperatures.

Japanese Kokai Patent No. Hei 5(1993)-4044 describes a process for the removal of oxygen from oxygen-containing gas by a temperature swing adsorption process using as the adsorbent a doped perovskite compound having the formula $ABO_x$, where A is selected from Sr, La, Ba, Pb and Ca, and B is selected from Co, Fe and Zr, the perovskite being doped with metals other than those listed for A and B. The adsorption step of the described process is carried out at a temperature in the range of 0 to 900° C., and the desorption step of the process is carried out at a temperature of 20 to 900° C.

It is sometimes desirable to separate oxygen from oxygen-containing gas streams by PSA at temperatures above 100° C. or even above 300° C. by PSA techniques. Furthermore, it would be highly desirable to provide a PSA process in which the adsorbed component is oxygen and it is obtained at very high purity. The present invention provides an oxygen-adsorbing PSA process that possesses these advantages.

SUMMARY OF THE INVENTION

The invention comprises a PSA process wherein oxygen is adsorbed from gas mixtures to produce, during the adsorbent regeneration step of the process, a high purity oxygen product gas. The process is also capable of producing substantially oxygen-free gas streams, during the adsorption step of the process, as the nonabsorbed product component of the gas mixtures.

According to a broad embodiment, the invention comprises a process for separating oxygen from a gas mixture at a temperature in the range of about 300 to about 1400° C. comprising (a) passing the gas mixture through at least one adsorption zone containing an oxygen-selective mixed conductor at an absolute pressure in the range of about 1 to about 50 bara, thereby preferentially adsorbing oxygen from the gas mixture, and (b) desorbing oxygen from the oxygen-selective mixed conductor by: (1) reducing the pressure in the at least one adsorption zone to about $10^{-3}$ to about 5 bara; (2) purging the at least one adsorption zone with a substantially oxygen-free gas; or (3) combinations of (1) and (2).

In a more preferred embodiment, the process further comprises repeatedly performing steps (a) and (b) in sequence as steps of a cyclic adsorption process.

According to a preferred embodiment, the oxygen-selective mixed conductor is selected from the group consisting of: (2a) perovskite substances having the structural formula $A_{1-x}M_xBO_{3-\delta}$, where A is a rare earth ion, M is Na, Ca, Sr, Ba or mixtures of these, B is Co, Mn, Cr, Fe or mixtures of these, x varies from 0 to 1 and $\delta$ is the deviation from stoichiometric composition resulting from the substitution of Sr, Ca and Ba for rare earth ions; (2b) ceramic substances selected from the group consisting of $Bi_2O_3$, $ZrO_2$, $CeO_2$, $ThO_2$, $HfO_2$ and mixtures of these, the ceramic substance being doped with CaO, rare earth metal oxides or mixtures of these; (2c) brownmillerite oxide; and (2d) mixtures of any of these, In a more preferred embodiment, the oxygen-selective mixed conductor is a perovskite substance of (2a). In a preferred aspect of this preferred embodiment, A is La, Y or mixtures of these, and/or M is Ca, Sr or mixtures of these and/or B is Co, Fe or mixtures of these. Preferably, in this more preferred embodiment, x varies from about 0.1 to 1, and more preferably, x varies from about 0.2 to 1.

In another preferred embodiment, the oxygen-selective mixed conductor is a ceramic substance of (2b), the ceramic substance being doped with a rare earth metal oxide selected from the group consisting of $Y_2O_3$, $Nb_2O_3$, $Sm_2O_3$, $Gd_2O_3$ and mixtures of these.

In another preferred embodiment, the process is carried out at a temperature in the range of about 600 to about 1200° C. In a more preferred embodiment, the process is carried out at a temperature in the range of about 750 to about 1100° C.

The adsorption step of the process, step (a), is preferably carried out at an absolute pressure in the range of about 1 to 20 bara and is more preferably carried out at an absolute pressure in the range of about 1 to about 15 bara. The adsorbent regeneration step, step (b), is preferably carried out by reducing the pressure in the at least one adsorption zone to a pressure in the range of about $10^{-2}$, i.e. 0.01 bara to about 1 bara, and is more preferably carried out by reducing the pressure in the at least one adsorption zone to subatmospheric pressure, for example, to about $10^{-1}$, i.e., 0.1 bara to about 0.8 bara.

Another preferred embodiment of the process of the invention comprises, during step (b), purging the oxygen-selective mixed conductor with a substantially oxygen-free gas. Preferred oxygen-free purge gases include steam, carbon dioxide, nitrogen, argon, helium and mixtures thereof.

In another preferred embodiment of the invention, the at least one adsorption zone contains particulate material having a thermal conductivity greater than that of the oxygen-selective mixed conductor material. In one aspect of this preferred embodiment, the particulate material is mixed with the oxygen-selective mixed conductor. In another aspect, the particulate material and oxygen-selective mixed conductor are formed into alternating layers.

In another preferred embodiment, moisture selective adsorbent is positioned upstream or downstream of the oxygen-selective mixed conductor. In one aspect of this preferred embodiment particulate material having a thermal conductivity greater than that of the oxygen-selective mixed conductor is positioned between the moisture-selective adsorbent and the mixed conductor.

In another preferred embodiment, carbon dioxide selective adsorbent is positioned upstream or downstream of the oxygen-selective mixed conductor. In one aspect of this preferred embodiment, particulate material having a thermal conductivity greater than that of the oxygen-selective mixed conductor is positioned between the carbon dioxide-selective adsorbent and the oxygen-selective mixed conductor.

In a preferred embodiment, the gas mixture is air.

DETAILED DESCRIPTION OF THE INVENTION

The adsorption process of the invention is useful for separating oxygen from other gases. It is particularly useful for separating oxygen from nitrogen, for example by adsorbing oxygen from air, and is thus very suitable for the production of either or both of nitrogen or oxygen from air. Since the adsorbent is very effective at high temperatures, it is ideal for use in processes where it is desirable to remove oxygen from gas streams that are at high temperatures. This is often the case in industrial chemical processes.

The process of the invention can be carried out in an adsorption system comprising a single adsorption unit or a battery of adsorption units operated in phase, or a plurality of adsorption units or batteries of adsorption units operated out of phase, whichever is desired. When a system comprising a single adsorption unit or a battery of units all of which are operated in phase is used, the adsorption step must be periodically stopped to permit regeneration of the adsorbent bed(s), whereas when a plurality of adsorption units are employed in parallel and operated out of phase, one or more units can be in adsorption service while one or more other units are undergoing regeneration to desorb oxygen, and if desired, collect the desorbed oxygen. Operation of the adsorption systems of the invention is cyclical. In preferred embodiments of the invention, adsorption cycles are repeatedly carried out in a manner such that production of the oxygen-depleted product or desorbed oxygen product gas is substantially continuous.

The adsorbent used in the process of this invention is an oxygen-selective mixed conductor. By "oxygen-selective mixed conductor" is meant a ceramic material that exhibits both oxygen ion conductivity and electronic conductivity. Properties of oxygen-selective mixed conductors are set forth in Lin et al., "Oxygen Permeation through Thin Mixed Conducting Solid Oxide Membranes", AIChE Journal, May 1994, Vol. 40, No. 5, pp. 786–798, the text of which is incorporated herein by reference.

Preferred oxygen-selective mixed conductors include ceramic materials selected from: (1) perovskite substances having the structural formula $A_{1-x}M_xBO_{3-\delta}$, where A is a rare earth ion, M is Na, Ca, Sr, Ba or mixtures of these, B is Co, Mn, Cr, Fe or mixtures of these, x varies from >0 to 1 and $\delta$ is the deviation from stoichiometric composition resulting from the substitution of Sr, Ca and Ba for rare earth ions; (2) ceramic materials selected from compounds such as $Bi_2O_3$, $ZrO_2$, $CeO_2$, $ThO_2$, $HfO_2$ and mixtures of these, wherein the ceramic material is doped with CaO, rare earth metal oxides, such as, for example, $Y_2O_3$, $Nb_2O_3$, $Sm_2O_3$, $Gd_2O_3$ and mixtures of these; a brownmillerite oxide; and mixtures of any of these.

In a preferred embodiment the ceramic oxygen-selective mixed conductor is a ceramic substance having the perovskite structure. It can be appreciated that the oxygen-adsorbing capacity of the perovskite compound increases as the degree of substitution of divalent cation for rare earth cation increases. The maximum oxygen adsorbing capability is attained when x, in the formula above, has a value of 1. Although oxygen adsorption can occur when the value of x is 0, it is generally not commercially feasible to use perovskite compounds having a value of x less than about 0.01 in the process of the invention. Preferably x has a value of about 0.1 to 1, and most preferably it has a value of about 0.2 to 1.

Theoretically, the value of $\delta$ is one-half the value of x, since for each two ions of divalent cation that are substituted for two ions of rare earth cation two electrons are lost; hence the net positive charge of the compound is decreased by 2 units. Accordingly, one ion of oxygen must be removed from the structure to maintain electrical neutrality. In practice, however, the estimation of the value of $\delta$ as one-half the value of x is only approximate, since changes in the oxygen partial pressure in the gas mixture and the presence of reducing components in the gas mixture may cause the actual value of $\delta$ to vary from one-half the value of x.

The preferred rare earth ions are La and Y, and the preferred divalent cations are Sr and Ca. Also, B is preferably Co or Fe. Examples of adsorbents falling within the scope of this invention are $La_{1-x}Sr_xBO_{3-\delta}$, $Y_{1-x}Sr_xBO_{3-\delta}$, $Y_{1-x}Ca_xBO_{3-\delta}$ and combinations of these, wherein B is Co, Mn, Cr or Fe. Specific perovskite adsorbents that are useful in the process of the invention include materials having the structural formulas: $La_{0.8}Sr_{0.2}MnO_{3-\delta}$, $La_{0.7}Ca_{0.3}FeO_{3-\delta}$, $Y_{0.9}Sr_{0.1}CrO_{3-\delta}$, $SrCoO_3$, etc. In the last compound, $SrCoO_3$, x has a value of 1.

It is sometimes desirable that the adsorption system include means to remove water vapor and/or carbon dioxide from the gas stream being fed to the system. This is particularly the case when the feed gas is ambient air and it is desired to produce moisture-free nitrogen. When it is desired to produce only oxygen, even moisture- and carbon dioxide-free oxygen, from, for example ambient air, it is not necessary to include water and/or carbon dioxide removal means in the system since the perovskite material does not adsorb moisture or carbon dioxide. When water and/or carbon dioxide removal means is included in the adsorption system, it may be in the form of an initial layer of moisture- and carbon dioxide-selective adsorbent, positioned at the inlet end of the adsorption vessels. Alternatively, the system may contain a separate air prepurification unit, to remove water vapor and carbon dioxide from the feed gas prior it its introduction into the mixed conductor-containing adsorption vessels. The prepurification system may comprise one or more layers of moisture- and/or carbon dioxide-selective adsorbents. For example, it may comprise a layer or layers of a desiccant, such as activated alumina or silica gel to remove water vapor, and one or more layers of carbon dioxide-selective adsorbent, such as zeolite 5A or zeolite 13X. Activated alumina is a preferred desiccant, since it serves to remove both moisture and carbon dioxide from the feed gas. Alternatively, the water and/or carbon dioxide removal means may be positioned downstream of the mixed conductor.

The temperature at which the adsorption process of the invention is carried out is a matter of choice and not critical. In general the adsorption process can be advantageously carried out at temperatures of about 300° C. or higher. The adsorption process is preferably carried out at temperatures above about 600° C., and it is most preferably carried out at temperatures above about 750° C. The upper temperature at which the process can be carried out can be any temperature below which the perovskite material used as adsorbent begins to melt. Generally the process is carried out at temperatures not exceeding about 1400° C., is preferably carried out at temperatures not exceeding about 1200° C., and is most preferably carried out at temperatures not in excess of about 1100° C. The adsorption and adsorbent regeneration steps may be carried out at the same or different temperatures, but are preferably carried out at about the same temperature, to avoid complications caused from temperature variation, such as thermal shock to the adsorbent and vessels and unnecessarily long heating and cooling times.

The sometimes significant quantities of heat generated during the adsorption step can be dissipated by including thermal ballast in the system. This can be accomplished by mixing particles of materials having high thermal conductivities with the mixed conductor. Alternatively, when the system comprises two or more layers of different adsorbent, for example an initial layer of alumina, silica gel or other desiccant, and a second layer of one of the above-described oxygen-selective perovskite adsorbent(s), a porous layer of high thermal conductivity material can be placed between the adsorbent layers. This prevents or minimizes formation of hot and cold spots in the adsorbent layers.

The pressure at which the adsorption step of the process is carried out is a matter of choice. In general, this step is usually carried out at a pressure at or above about 0.5 bar, absolute (bara). The minimum pressure at which the adsorption step is carried out is preferably about 1 bara and is most preferably about 5 bara. The upper pressure limit of the adsorption step of the process is determined by economics and limitations of the adsorption system and, in general, this step is desirably carried out at absolute pressures not in excess of about 50 bara, is preferably carried out at pressures not in excess of about 20 bara, and is most preferably carried out at pressures not in excess of about 15 bara.

The pressure at which adsorbent regeneration is carried out is likewise a matter of choice, and the minimum pressure depends upon whether or not vacuum equipment is used to withdraw adsorbed gas from these vessels. Typically, the lower pressure limit during adsorbent regeneration in these vessels can be as low as $10^{-6}$ bara, but is preferably not lower than about 0.01 bara, and is most preferably not lower than about 0.1 bara. Adsorbent regeneration may be carried out at pressures as high as about 5 bara, but this step is preferably carried out at pressures not higher than about 2 bara, and is most preferably carried out at pressures not in excess of about 1 bara. Most preferably adsorbent regeneration is carried out by reducing the pressure in the adsorption zone(s) to subatmospheric pressures, i.e. pressures below about 1 bara, using vacuum means such as a vacuum pump. During the adsorbent regeneration step, the adsorbent may be purged with a gas that is substantially free of oxygen. Preferred purge gases include steam, carbon dioxide, nitrogen, argon, helium and mixtures of these.

It will be appreciated that it is within the scope of the present invention to utilize conventional equipment to monitor and automatically regulate the flow of gases within the system so that it can be fully automated to run continuously in an efficient manner.

The invention is further illustrated by the following example in which, unless otherwise indicated, parts, percentages and ratios are on a volume basis.

EXAMPLE

A high temperature PSA process was simulated in an adsorption system comprising 2 adsorption vessels arranged in parallel and operated 180° out of phase such that one adsorption vessel is in the adsorption mode while the other is in the adsorbent regeneration mode, and vice versa. Each vessel of the system has an internal diameter of 1 inch and a length of 20 inches. The vessels are assumed to be packed with 250 g of $La_{0.5}Sr_{0.5}Co_{0.5}Fe_{0.5}O_{3-\delta}$ perovskite oxide having particle size of 1–3 mm. The adsorption and regeneration steps of the process are assumed to be carried out at a temperature of 900° C. The adsorption step is assumed to be carried out at a pressure of 10 bara, and adsorbent regeneration is assumed to be carried out to a final pressure of 0.1 bara. When the average flow rate of air into the system is 11 liter/min (STP), the projected production rates of nitrogen and oxygen from the system are about 6.01 liter (STP)/min and 1.62 liter(STP)/min, respectively. The nitrogen and oxygen thus produced is projected to have purities higher than 98% and 99.9%, respectively.

Although the invention has been described with particular reference to a specific experiment, the example is merely exemplary of the invention and variations are contemplated. The scope of the invention is limited only by the breadth of the appended claims.

What is claimed is:

1. A process for separating oxygen from a gas mixture at a temperature in the range of about 300 to about 1400° C. comprising (a) passing said gas mixture through at least one adsorption zone containing an oxygen-selective mixed conductor at an absolute pressure in the range of about 1 to about 50 bara, thereby preferentially adsorbing oxygen from said gas mixture, and (b) desorbing oxygen from said oxygen-selective mixed conductor by: (1) reducing the pressure in said at least one adsorption zone to about $10^{-3}$ to about 5 bara; (2) purging said at least one adsorption zone with a substantially oxygen-free gas; or (3) combinations of (1) and (2).

2. The process of claim 1, further comprising repeatedly performing steps (a) and (b) in sequence as steps of a cyclic adsorption process.

3. The process of claim 2, wherein said oxygen-selective mixed conductor is selected from the group consisting of: (2a) perovskite substances having the structural formula $A_{1-x}M_xBO_{3-\delta}$, where A is a rare earth ion, M is Na, Ca, Sr, Ba or mixtures of these, B is Co, Mn, Cr, Fe or mixtures of these, x varies from 0 to 1 and $\delta$ is the deviation from stoichiometric composition resulting from the substitution of Sr, Ca and Ba for rare earth ions; (2b) ceramic substances selected from the group consisting of $Bi_2O_3$, $ZrO_2$, $CeO_2$, $ThO_2$, $HfO_2$ and mixtures of these, the ceramic substance being doped with CaO, rare earth metal oxides or mixtures of these; (2c) brownmillerite oxide; and (2d) mixtures of any of (2a), (2b) and (2c).

4. The process of claim 3, wherein said oxygen-selective mixed conductor is a perovskite substance of (2a).

5. The process of claim 4, wherein x varies from about 0.1 to 1.

6. The process of claim 4, wherein A is La, Y or mixtures of these.

7. The process of claim 4, wherein M is Ca, Sr or mixtures of these.

8. The process of claim 4, wherein B is Co, Fe or mixtures of these.

9. The process of claim 4, wherein A is La, Y or mixtures of these, M is Ca, Sr or mixtures of these and B is Co, Fe or mixtures of these.

10. The process of claim 9, wherein x is 0.2 to 1.

11. The process of claim 3, wherein said oxygen-selective mixed conductor is a ceramic substance of (2b), said ceramic substance being doped with a rare earth metal oxide selected from the group consisting of $Y_2O_3$, $Nb_2O_3$, $Sm_2O_3$, $Gd_2O_3$ and mixtures of these.

12. The process of claim 3, wherein said at least one adsorption zone contains particulate material having a thermal conductivity greater than that of said oxygen-selective mixed conductor.

13. The process of claim 12, wherein said particulate material is mixed with said oxygen-selective mixed conductor.

14. The method of claim 12, wherein said particulate material and said oxygen-selective mixed conductor are formed into alternating layers.

15. The process of claim 3, wherein moisture selective adsorbent is positioned upstream or downstream of said oxygen-selective mixed conductor.

16. The process of claim 15, wherein particulate material having a thermal conductivity greater than that of said oxygen-selective mixed conductor is positioned between said moisture-selective adsorbent and said oxygen-selective mixed conductor.

17. The process of claim 3, wherein carbon dioxide selective adsorbent is positioned upstream or downstream of said oxygen-selective mixed conductor.

18. The process of claim 17, wherein particulate material having a thermal conductivity greater than that of said oxygen-selective mixed conductor is positioned between said carbon dioxide-selective adsorbent and said mixed conductor.

19. The process of claim 1, carried out at a temperature in the range of about 600 to about 1200° C.

20. The process of claim 1, wherein step (a) is carried out at an absolute pressure in the range of about 1 to 20 bara and step (b) is carried out by reducing the pressure in said at least one adsorption zone to about $10^{-2}$ to about 1 bara.

21. The process of claim 1, carried out at a temperature in the range of about 750 to about 1100° C.

22. The process of claim 1, wherein step (b) is carried out by reducing the pressure in said at least one adsorption zone to subatmospheric pressure.

23. The process of claim 1, further comprising, during step (b), purging said at least one adsorption zone with a substantially oxygen-free gas.

24. The process of claim 23, wherein said substantially oxygen-free gas is steam, carbon dioxide, nitrogen, argon, helium or mixtures thereof.

25. The process of claim 1, wherein said gas mixture is air.

* * * * *